United States Patent Office 3,110,494
Patented Nov. 12, 1963

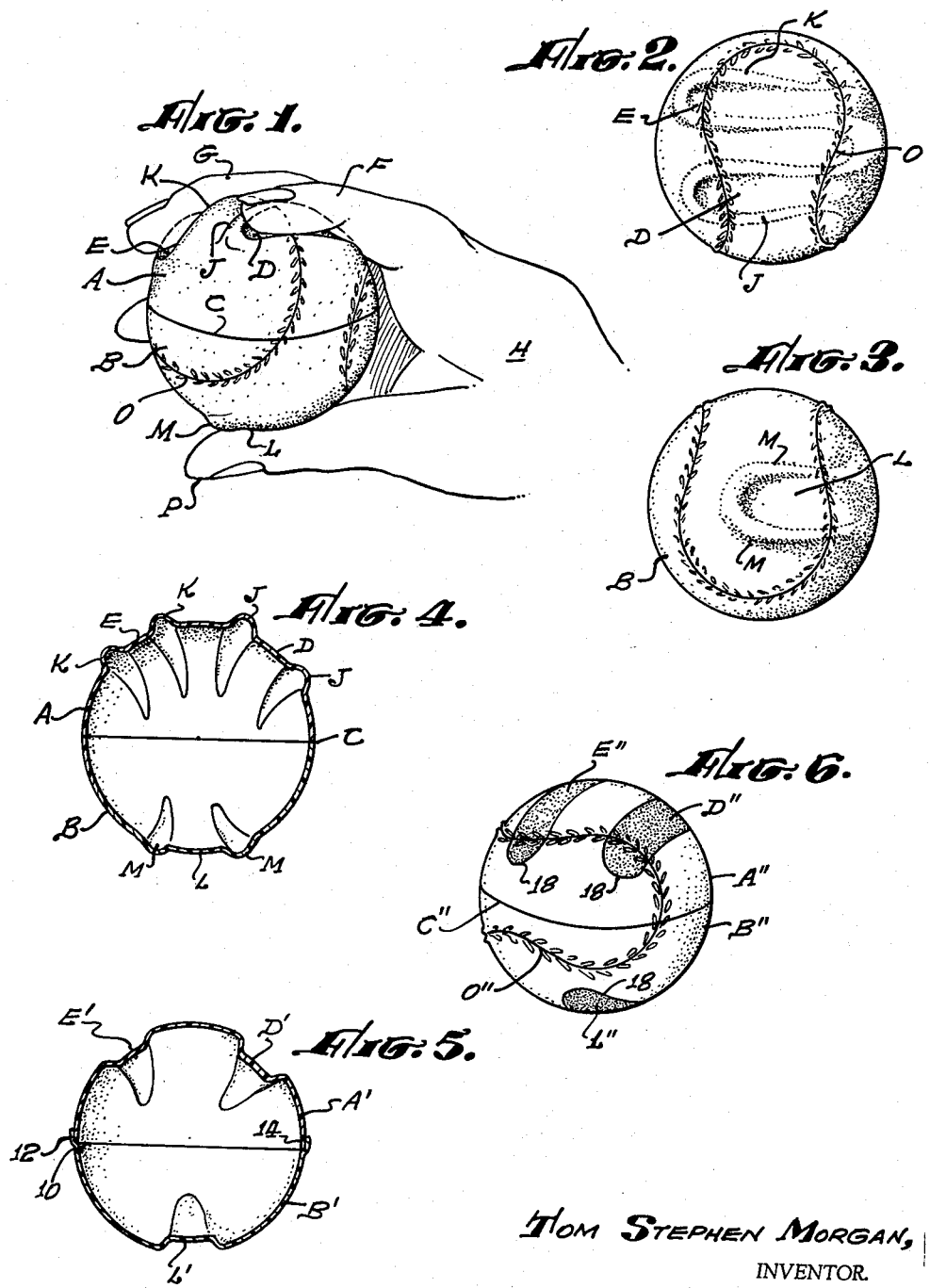

3,110,494
BASEBALL TRAINING DEVICE
Tom Stephen Morgan, 2724 Calle Aventura,
San Pedro, Calif.
Filed Apr. 17, 1961, Ser. No. 103,299
1 Claim. (Cl. 273—26)

The present invention relates generally to the field of sports, and more particularly to a training device for use in learning to throw a baseball with a particular curve or break.

The game of baseball, whether amateur or professional, continues to increase in popularity each year, and as a result thousands of young men annually seek to learn how to throw a baseball with some degree of accuracy so that it will curve or break. Many instruction books have been written and published in the past on the art of pitching, but in the main, they have met with limited success in describing and illustrating the manner in which a baseball should be thrown to impart a curve or break thereto.

The difficulty in illustrating and describing the manner in which a baseball should be held in order to throw it with a curve or break is that the ball is a three-dimensional object which the fingers and thumb must grasp in a certain manner, a concept which is impossible to fully impart by means of words coupled with a two-dimensional picture.

A major object of the invention is to provide a training device by means of which it is possible for the un-initiated to learn how to place the fingers and thumb in grasping a baseball to impart a particular curve or break to a ball in throwing or pitching the same.

Another object of the invention is to supply a training device on which the correct placement of the fingers and thumb is indicated in order that the user may learn how to grasp a baseball and in throwing it, impart a particular curve or break thereto.

Yet another object of the invention is to provide a training device by means of which it is not only possible to learn the correct placement of the fingers and thumb on a baseball in order to throw it with a particullar curve or break, but a device which actually permits the trainee to develop a "feel" for throwing the desired curve or break before actually doing so with a standard baseball.

A still further object of the invention is to supply a replica of a baseball that is light in weight, inexpensive to manufacture, and which can be fabricated in the form of semi-spherical shells that occupy a minimum of space before use, yet which can be easily and quickly assembled.

Still another object of the invention is to provide a training device for youngsters and young men which, due to their interest in baseball and the low cost thereof, makes the device ideally suited for a premium for use in advertising.

These and other objects and advantages of the invention will become apparent from the following description of a preferred and certain alternate forms thereof, and from the accompanying drawing illustrating the same in which:

FIGURE 1 is a perspective view of a preferred from of the training device showing the manner in which a trainee's fingers and thumb automatically slip into correct placement in order to throw a baseball with a particular curve or break;

FIGURE 2 is a top plan view of the invention shown in FIGURE 1;

FIGURE 3 is a bottom plan view of the device shown in FIGURE 1;

FIGURE 4 is a cross-sectional view of the training device shown in FIGURE 1;

FIGURE 5 is a cross-sectional view of a first alternate form of the device; and

FIGURE 6 is a perspective view of a second alternate form of the invention.

With continued reference to the drawing for the general arrangement of the invention, it will be seen that the preferred form thereof, as shown in FIGURES 1 to 4, includes two semi-spherical shells A and B. Shells A and B are rigidly joined to one another at a circumferentially extending junction line C by means of glue, cement, or other bonding agent.

The first shell A has two laterally spaced elongate areas D and E defined thereon which are contacted by the forefinger F and middle finger G of the trainee's hand H when a particular curve or break is to be thrown. To facilitate placements of the fingers F and G on the exterior surface of shell A, two generally U-shaped ribs J and K respectively are formed on the shell. Rib J, as can best be seen in FIGURE 2, projects upwardly from the longitudinal sides and the forward end of the second area E.

A single elongate area L is defined on the second semi-spherical shell B by a U-shaped raised rib M that extends along the longitudinal sides and forward end thereof. Ribs J, K and M (FIGURE 4) have a raised transverse convex-concave cross section and are integral portions of shells A and B. Ribs J, K and M are preferably formed concurrently with the formation of shells A and B.

Although a number of materials may be used in the fabrication of shells A and B, from the standpoint of economy as well as ease of production thereof with ribs J, K and M molded therein, it has been found that the use of a polymerizable resin is preferable for this purpose. However, should it be desired, thin metal sheet material such as aluminum, magnesium, or alloys thereof may be employed, providing the metal or alloy selected is adapted to be impact extruded, or otherwise formed into the configuration of the invention shown in FIGURE 1.

Although not necessary, it is desirable that replicas of seam lines O embodied in a conventional baseball be reproduced on the exterior surfaces of the first and second shells A and B, for the seam lines O add realism to the training device when gripped in the manner shown in FIGURE 1. Also, inasmuch as the seam lines O on shells A and B must be matched at the junction line C, they assure that the shells will be properly oriented at the time they are bonded together whereby the areas D, E and L are in proper relationship. Before production of shells A and B with areas D, E and L defined thereon, an individual such as a well-known pitcher is requested to grasp a ball or shell (not shown) as though he were going to throw it and impart a certain curve or break thereto.

The positioning of the pitcher's forefinger and middle finger on the ball or shell, as well as his thumb, is carefully outlined thereon, which areas so outlined later become the areas D, E and L. The areas of contact of the pitcher's fingers and thumb on the shell or ball can be easily defined by coating the pitcher's fingers and thumb with a color-transferring material (ink or the like), which leaves an imprint of the contact areas on the ball or shell. Thereafter this finger-and-thumb pattern is transferred to the mold or molds (not shown) in which the shells A and B are to be formed, and the molds are recessed and contoured to have the ribs J, K and M formed as a part of the shells A and B at the time of production thereof.

A first alternate form of the invention is shown in FIGURE 5 and includes two semi-spherical shells A' and B' having areas D', E' and L' recessed therein. In this form of the invention the ribs J, K and M are eliminated. In cetain uses of the invention such as a "give-away"

premium in a packaged product, it is desirable that the device occupy a minimum of space, and therefore would normally be disassembled. Accordingly, to facilitate assembly thereof, a circumferentially extending seat 10 is formed on the outer portion of shell B, which seat has a cylindrical flange 12 extending upwardly from the outer edge thereof. Shell A includes a circumferential edge portion 14 that fits snugly within the confines of flange 12 and may be held in engagement therewith, either by frictional contact or by bonding the flange 12 and edge 14 to one another with glue or other adhesive (not shown).

A second alternate form of the invention is shown in FIGURE 6 which includes two smooth-surfaced semi-spherical shells A″ and B″ that are bonded together at their junction line C″. Elongate areas E″, D″ and L″ are defined on the surfaces of shells A″ and B″ in a color contrasting to that of the shells to indicate the placement of the fingers F and G and thumb P of the trainee.

The manner of using the invention is extremely simple, and is the same irrespective of whether the preferred, first or second alternate form thereof is employed. The trainee grasps the assembled pair of shells A, B; A′, B′; or A″, B″ as the case may be, places his fingers F, G, and thumb P in the areas D, E, L; D′, E′, L′; or D″, E″, L″, and goes through the motions of actually throwing the invention, but without doing so. After the trainee is thoroughly conversant with the positioning of his fingers F, G and thumb P on the invention in a manner to throw a particular curve or break, he discards the device and grasps a standard baseball (not shown) in the same manner. When the baseball is then thrown, with the trainee's fingers F, G and thumb P grasping it in the same configuration as on the invention, the trainee will find that placement of his fingers and thumb materially assists in throwing the baseball with the desired curve or break.

Each of the training devices of the present invention, whether the preferred, first or second alternate forms thereof, discloses to the trainee the positioning of his fingers and thumb for a particular curve or break. Therefore, if the trainee desires to perfect his pitching technique to include a number of curves or breaks, he will require a series of the inventions, each of which bear indicia for different placement of the fingers and thumb thereon.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claim.

I claim:

A training device for imparting to the user the proper positioning of the fingers and thumb on a baseball if it is to be thrown with a particular curve or break, including: first and second semi-spherical shells, the exterior surfaces of which simulate first and second halves of the exterior surface of a baseball, said first and second shells having replicas of the casing seams reproduced on the exterior surface thereof; first and second circumferentially extending means on said first and second halves for interlocking said shells together to form a sphere when the ends of said simulated seams are in alignment; and a plurality of ribs that extend outwardly from the exterior surfaces of said semi-spherical shells, which ribs when contacted by said user's fingers and thumb after said shells have been interlocked together disposed said fingers and thumb in a predetermined spaced pattern, with said fingers and thumb when repositioned in said spaced pattern on the exterior surface of a baseball assisting said user to throw said baseball with said particular curve or break.

References Cited in the file of this patent

UNITED STATES PATENTS

| | | |
|---|---|---|
| 2,078,382 | Hanshaw | Apr. 27, 1937 |
| 2,091,684 | Mabee | Aug. 31, 1937 |
| 2,263,052 | Ross | Nov. 18, 1941 |
| 2,925,273 | Pratt | Feb. 16, 1960 |